United States Patent
Oswald et al.

(10) Patent No.: US 10,046,676 B2
(45) Date of Patent: Aug. 14, 2018

(54) CHILD RESTRAINT WITH ENERGY MANAGEMENT SYSTEM

(71) Applicant: Dorel Juvenile Group, Inc., Foxboro, MA (US)

(72) Inventors: Kevin C Oswald, Columbus, IN (US); Kelley L Clayburn, Hope, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 89 days.

(21) Appl. No.: 15/217,400

(22) Filed: Jul. 22, 2016

(65) Prior Publication Data

US 2017/0021745 A1     Jan. 26, 2017

Related U.S. Application Data

(60) Provisional application No. 62/195,922, filed on Jul. 23, 2015.

(51) Int. Cl.
    *B60N 2/28*      (2006.01)
    *B60N 2/42*      (2006.01)
    *B60N 2/888*      (2018.01)

(52) U.S. Cl.
CPC .......... *B60N 2/2884* (2013.01); *B60N 2/2851* (2013.01); *B60N 2/42* (2013.01); *B60N 2/888* (2018.02)

(58) Field of Classification Search
CPC ...... B60N 2/2884; B60N 2/2851; B60N 2/28; B60N 2/42; B60N 2/4882; B60N 2/4885; B60N 2/885; B60N 2/888
USPC ....................................... 297/216.11, 216.12
See application file for complete search history.

(56) References Cited

U.S. PATENT DOCUMENTS

| | | | |
|---|---|---|---|
| 6,758,520 B2 | 7/2004 | Pehrson | |
| 6,918,633 B2 * | 7/2005 | Forkel | B60N 2/66 297/284.4 |
| 7,338,119 B2 | 3/2008 | Burch | |
| 7,350,851 B2 | 4/2008 | Barvosa-Carter et al. | |
| 7,467,824 B2 | 12/2008 | Nakhla et al. | |
| 7,472,952 B2 | 1/2009 | Nakhla | |
| 7,506,926 B2 | 3/2009 | Carine | |
| 7,537,283 B2 | 5/2009 | Niitsuma et al. | |
| 7,740,322 B2 | 6/2010 | Burch | |
| 7,744,154 B2 | 6/2010 | Marsden et al. | |
| 7,850,234 B2 | 12/2010 | Marsden et al. | |
| 7,959,223 B2 | 6/2011 | Marsden et al. | |
| 8,029,054 B2 | 10/2011 | Marsden et al. | |
| 8,038,209 B2 | 10/2011 | Marsden et al. | |
| 8,038,212 B2 | 10/2011 | Vickers et al. | |
| 8,056,971 B2 | 11/2011 | Marsden et al. | |
| 8,056,972 B2 | 11/2011 | Marsden et al. | |
| 8,061,768 B2 | 11/2011 | Amirault et al. | |
| 8,104,829 B2 | 1/2012 | Fritz et al. | |
| 8,128,165 B2 | 3/2012 | Marsden et al. | |
| 8,573,693 B2 | 11/2013 | Gaudreau | |
| 8,647,544 B2 | 2/2014 | Burch | |

(Continued)

FOREIGN PATENT DOCUMENTS

| | | |
|---|---|---|
| CA | 2556854 A1 | 9/2005 |
| CA | 2558978 A1 | 3/2007 |

*Primary Examiner* — Ryan D Kwiecinski
(74) *Attorney, Agent, or Firm* — Barnes & Thornburg LLP (57) ABSTRACT

A child restraint includes a juvenile vehicle seat including a seat bottom and a seat back. The child restraint also includes an energy dissipater coupled to the seat back.

23 Claims, 9 Drawing Sheets

(56) References Cited

U.S. PATENT DOCUMENTS

| | | |
|---|---|---|
| 8,714,641 B2 | 5/2014 | Cyoukyu et al. |
| 8,746,792 B2 | 6/2014 | Ruthinowski et al. |
| 8,845,019 B2 | 9/2014 | Sawada |
| 8,851,514 B2 | 10/2014 | Renaudin et al. |
| 2006/0181120 A1* | 8/2006 | Schimmoller ........... B60N 2/26 297/217.6 |
| 2007/0063556 A1* | 3/2007 | Santamaria .......... B60N 2/2812 297/250.1 |
| 2007/0236061 A1* | 10/2007 | Meeker .................... B60N 2/20 297/250.1 |
| 2009/0309405 A1* | 12/2009 | Maciejczyk ......... B60N 2/2812 297/391 |
| 2010/0187879 A1* | 7/2010 | Brandl ................. B60N 2/2851 297/250.1 |
| 2011/0285187 A1* | 11/2011 | Horton ................. B60N 2/2812 297/250.1 |
| 2012/0217788 A1 | 8/2012 | Vallejo |
| 2012/0242129 A1* | 9/2012 | Gaudreau, Jr. ...... B60N 2/2812 297/256.16 |
| 2012/0306243 A1 | 12/2012 | Oltman et al. |
| 2014/0077565 A1 | 3/2014 | Baumgarten et al. |
| 2014/0252815 A1* | 9/2014 | Xu ....................... B60N 2/2851 297/183.1 |
| 2014/0327287 A1* | 11/2014 | Komatsubara ....... B60N 2/5816 297/391 |
| 2017/0021745 A1* | 1/2017 | Oswald ................ B60N 2/2884 |
| 2017/0151894 A1* | 6/2017 | McRoberts .......... B60N 2/2884 |
| 2017/0282758 A1* | 10/2017 | Mitchell .............. B60N 2/2866 |
| 2017/0349065 A1* | 12/2017 | Pleiman ................ B60N 2/809 |
| 2018/0029507 A1* | 2/2018 | Jane Santamaria .. B60N 2/2821 |

\* cited by examiner

CHILD RESTRAINT WITH ENERGY MANAGEMENT SYSTEM

PRIORITY CLAIM

This application claims priority to U.S. Provisional Application No. 62/195,922 filed Jul. 23, 2015, the disclosure of which is hereby incorporated herein in its entirety.

BACKGROUND

The present disclosure relates to child restraints, and in particular, to juvenile seats for use on passenger seats in vehicles. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in gs.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child restraint.

In illustrative embodiments, the energy-dissipation system comprises several cantilevered energy-dissipation fingers coupled to a panel included in the juvenile vehicle seat. Each finger is made of a flexible resilient material to flex relative to the panel in a controlled manner when exposed to an external impact force. The fingers cooperate with one another to absorb external energy associated with the external impact force to minimize g-loads experienced by a child seated in a juvenile vehicle seat having the panel and carrying the energy-dissipation system.

In illustrative embodiments, four cantilevered energy-dissipation fingers are coupled to the panel and arranged to flex independently of one another when exposed to an external impact force. A first cantilevered energy-dissipation finger is arranged to extend upwardly toward a downwardly extending fourth cantilevered energy-dissipation finger to form a first horizontal slot therebetween. A second cantilevered energy-dissipation finger is arranged to lie in laterally space-apart, side-by-side relation to the first cantilevered energy-dissipation finger. A third cantilevered energy-dissipation finger is arranged to lie in laterally spaced-apart, side-by-side relation to the fourth cantilevered energy-dissipation finger. The second cantilevered energy-dissipation finger is arranged to extend upwardly toward the downwardly extending third cantilevered energy-dissipation finger to form a second horizontal slot therebetween.

In illustrative embodiments, the juvenile vehicle seat includes a seat bottom and a seat back arranged to extend upwardly from the seat bottom and coupled to the cantilevered energy-dissipation fingers included in the energy-dissipation system. The panel is included in the seat back. The seat back illustratively includes a backrest arranged to extend upwardly from the seat bottom and a headrest coupled to the backrest and formed to include the panel that is coupled to each of the cantilevered energy-dissipation fingers. The fingers are arranged to lie near the head of a child seated on the seat bottom of the juvenile vehicle seat so that energy associated with rearward movement of the head of a child seated in the juvenile vehicle seat relative to the headrest is dissipated owing rearward flexing movement of the free ends of the cantilevered energy-dissipation fingers relative to one another and to the panel that supports those fingers.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child-restraint system including a juvenile vehicle seat having a seat bottom and a seat back extending upwardly from the seat bottom and an energy-dissipation system coupled to the seat back and showing that the seat back includes a backrest arranged to extend upwardly from the seat bottom and a headrest coupled to the backrest and configured to include a center panel and showing that the energy-dissipation system illustratively comprises four cantilevered energy-dissipation fingers and that each finger is coupled to the center panel of the headrest for independent flexing movement relative to the other fingers and to the center panel as suggested in FIGS. 7 and 8 in response to rearward movement of a head of a child seated in the juvenile vehicle seat to apply an impact force to one or more of the cantilevered energy-dissipation fingers;

FIG. 6 is an enlarged rear elevation view of a portion of the headrest of FIG. 5 showing the laterally spaced apart upwardly extending first and second energy-dissipation fingers and the laterally spaced apart downwardly extending third and fourth energy-dissipation fingers and showing TIP-TO-TIP spaced-apart alignment of the first and fourth energy-dissipation fingers to create a first horizontal slot therebetween and TIP-TO-TIP alignment of the second and third energy-dissipation fingers to create a second horizontal slot therebetween and showing that a vertical long slot is formed between the four fingers, a first short slot is formed along an outer side of the first and fourth fingers to locate those fingers between the long slot and the first short slot, and a second short slot is formed along an outer side of the second and third fingers to locate those fingers between the long slot and the second short slot;

DETAILED DESCRIPTION

Figure 1:
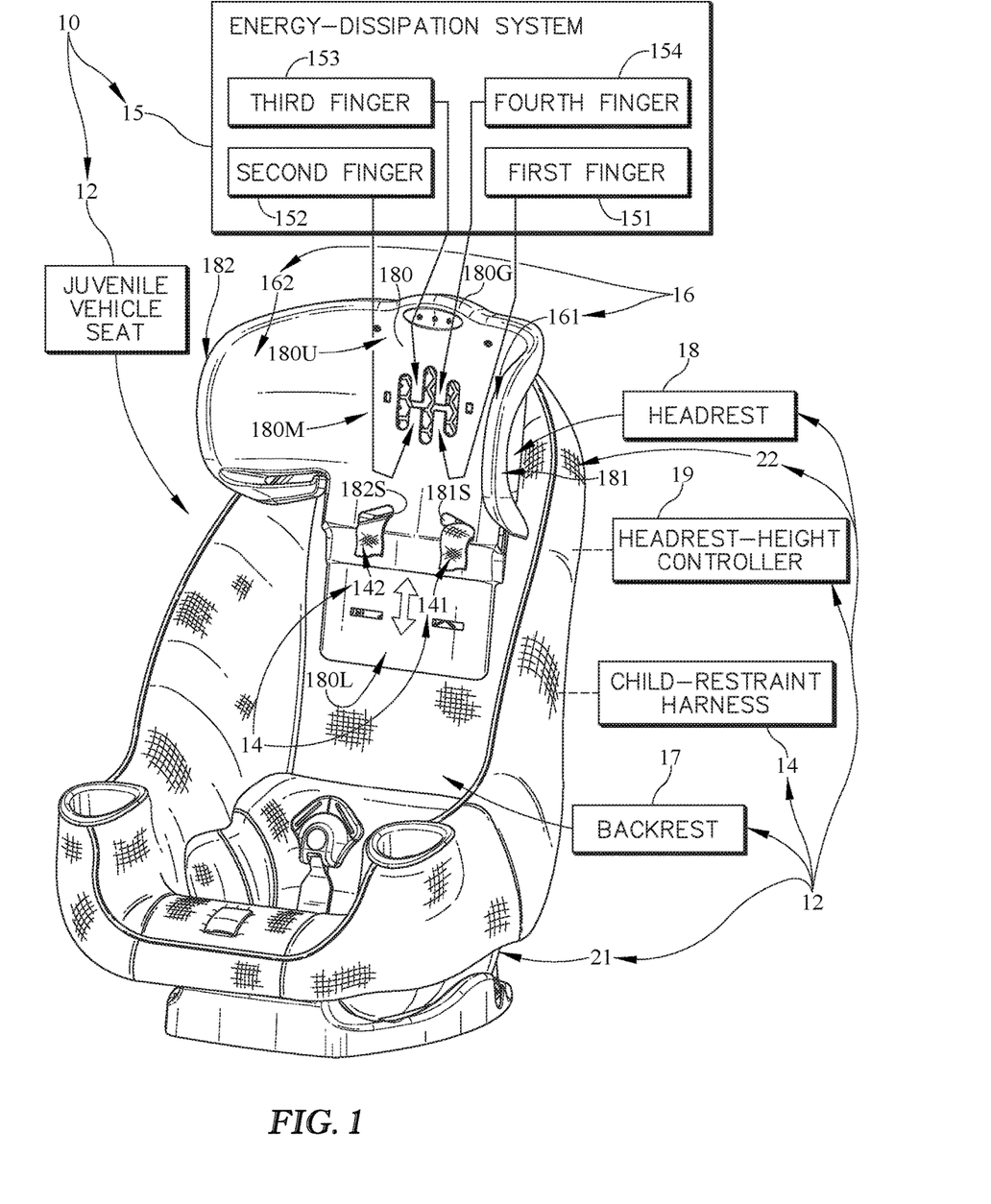
FIG. 1A is a view of the child-restraint system of FIG. 1 with most of the fabric covering on the juvenile vehicle seat removed to show illustrative structure of the juvenile vehicle seat.
Figure 1A:
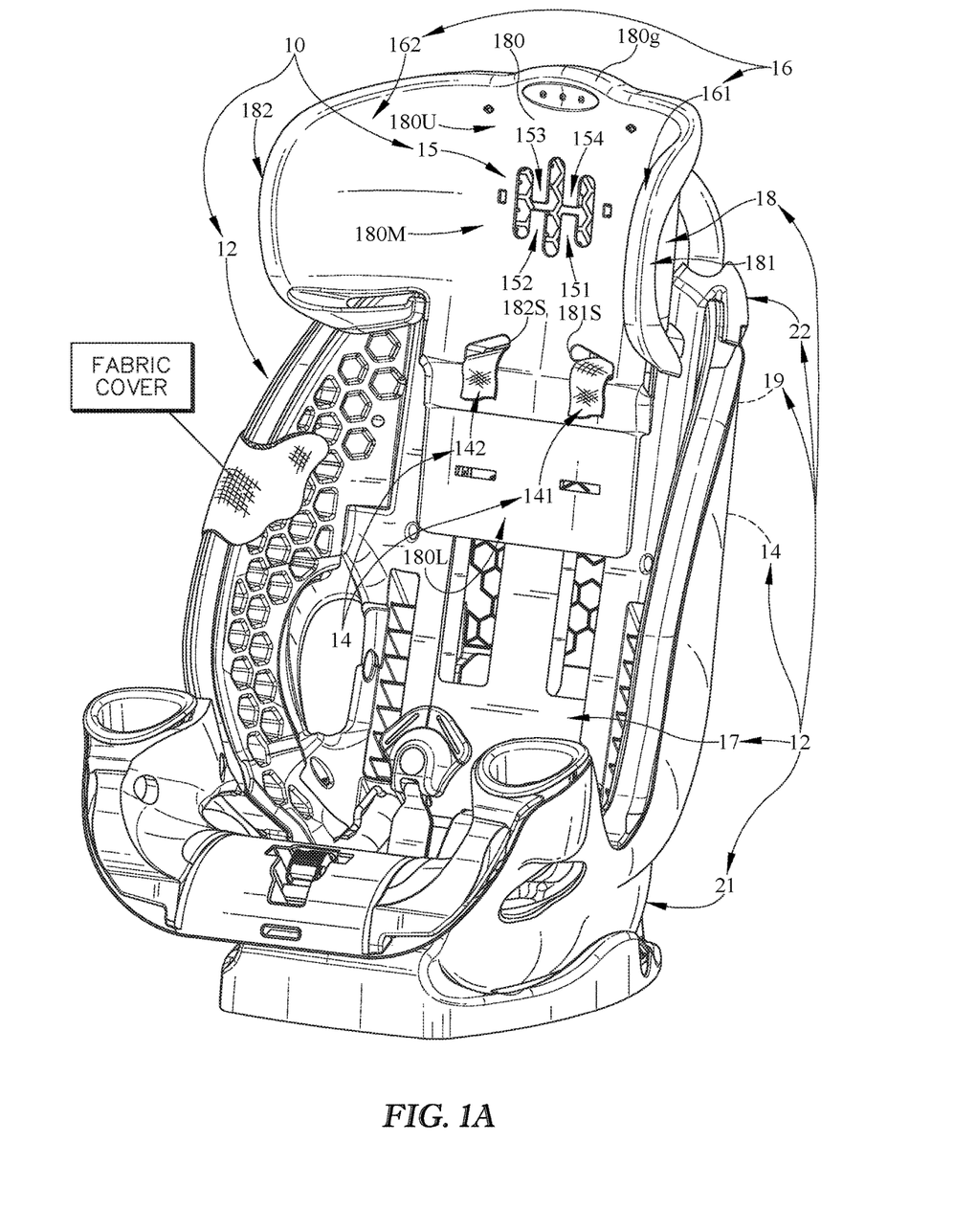

An illustrative child restraint 10 comprises juvenile vehicle seat 12 and an energy-dissipation system 15 comprising four flexible energy-dissipation fingers 151, 152, 153, and 154 coupled to juvenile vehicle seat 12 as suggested in FIGS. 1 and 1A. Each of fingers 151-154 is coupled to a headrest 18 included in juvenile vehicle seat 12 for independent flexing movement relative to the other fingers in response to application of forces to those fingers. Energy-dissipation fingers 151-154 function alone or in tandem in accordance with the present disclosure as suggested, for example, in FIGS. 7 and 8, to move relative to headrest 18 to dissipate energy and minimize g-loads experience by a child seated in juvenile vehicle seat 12 during exposure of seat 12 to an external impact force.

Juvenile vehicle seat 12 includes a seat bottom 21 and a seat back 22 arranged to extend upwardly from a rear end of seat bottom 21 as suggested in FIG. 1. Energy-dissipation system 15 is coupled to seat back 22 and arranged to receive a rearwardly directed force ($F_{Head}$) applied by the moving head (not shown) of a child seated in juvenile vehicle seat 12 as suggested diagrammatically in FIG. 7 during exposure of juvenile vehicle seat 12 to an external impact force. Energy-dissipation system 15 is configured to provide means movable relative to headrest 18 for dissipating energy associated with the moving head of a child seated in juvenile vehicle seat 12 following application of external impact forces to juvenile vehicle seat 12.

In the illustrated embodiment, seat back 22 of juvenile vehicle seat 12 includes a backrest 17 and headrest 18 associated with backrest. Backrest 17 is arranged to extend upwardly from seat bottom 21 as suggested in FIG. 1. Headrest 18 is coupled to an upper portion of backrest 17. In illustrative embodiments, headrest 18 is mounted for up-and-down movement on backrest 17 to change the height of energy-dissipation system 15 relative to seat bottom 21. It is within the scope of the present disclosure for a caregiver to use a headrest-height controller 19 included in juvenile vehicle seat 12 and coupled to each of the headrest 18 and, for example, the backrest 17 to change the height of headrest 18 relative to seat bottom 21 as suggested diagrammatically in FIG. 1.

Figure 2:
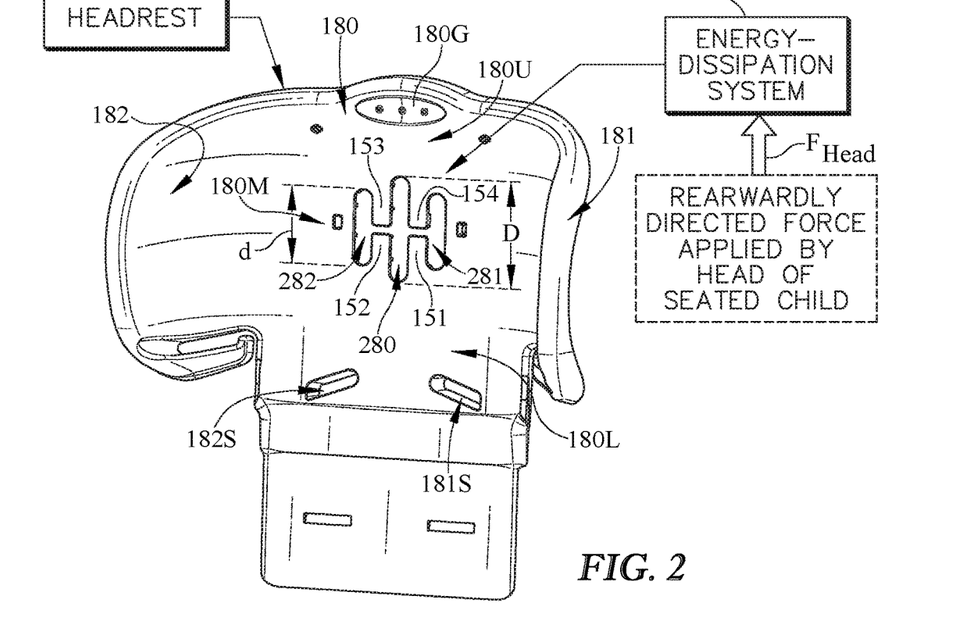
FIG. 2 is a front perspective view of the headrest of FIGS. 1 and 1A showing that a first cantilevered energy-dissipation finger (on the right) is arranged to extend upwardly toward a downwardly extending fourth cantilevered energy-dissipation finger to form a first horizontal slot therebetween and that a second cantilevered energy-dissipation finger (on the left) is arranged to extend upwardly toward a downwardly extending third cantilevered energy-dissipation finger to form a second horizontal slot therebetween.
Figure 3:
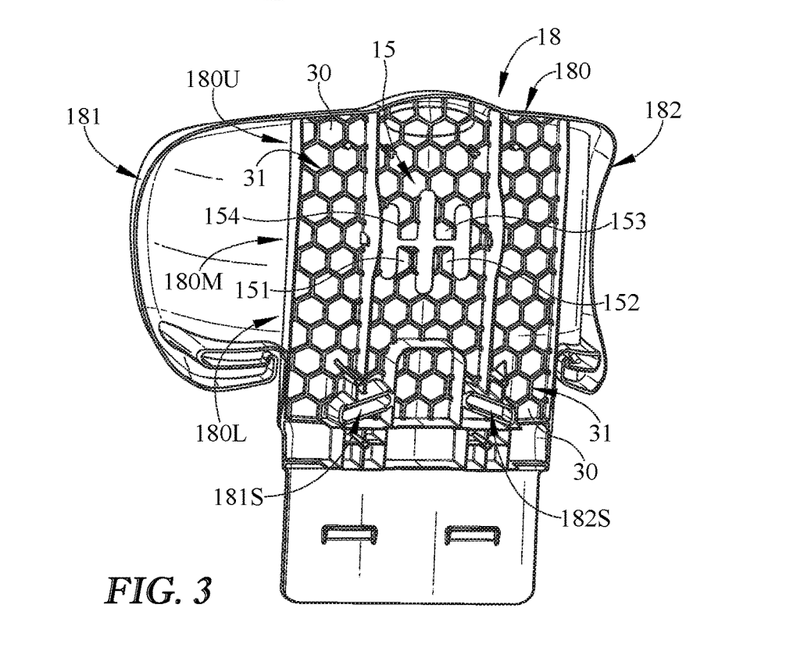
FIG. 3 is a rear perspective view of the headrest of FIG. 2 with the headrest-height controller omitted to reveal the four cantilevered energy-dissipation fingers coupled to the center panel of the headrest.

Headrest 18 includes a center panel 180, a first side-wing panel 181 coupled to one side of center panel 180, and an opposite second side-wing panel 102 coupled to an opposite side of center panel 180 as suggested in FIGS. 1-3. Panels 181, 180, 182 are arranged to lie in series to surround partly the head of a child seated in juvenile vehicle seat 12 in an illustrative embodiment to limit head movement during exposure of juvenile vehicle seat 12 to external impact forces.

Another energy-dissipation system 16 is coupled to headrest 18 of seat back 22 of juvenile vehicle seat 12 as suggested in FIG. 1. Energy-dissipation system 16 comprises two ride-down pads 161, 162 in an illustrative embodiment. A first ride-down pad 161 is coupled to first side-wing panel 181. A second ride-down pad 162 is coupled to second side-wing panel 182. Each ride-down pad 161, 162 is designed to minimize g-loads experienced by a child seated on seat bottom 21 of juvenile vehicle seat 12 during exposure of seat 12 to an external impact force. Reference is made to U.S. Pat. No. 7,744,154, the entirety of which is hereby incorporated by reference herein, for disclosures of various ride-down pad configurations and mounting arrangements.

Center panel 180 of headrest 18 includes an upper portion 180U arranged to lie above the four energy-dissipation fingers 151-154 and a lower portion 180L arranged to lie below the four energy-dissipation fingers 151-154 as suggested in FIGS. 2 and 4. Upper portion 180U of center panel 180 is coupled to root ends 153R, 154R of each of the third and fourth energy-dissipation fingers 153, 154, respectively, as suggested in FIG. 4. Lower portion 180L of center panel 180 is coupled to root ends 151R, 152R of each of the first and second energy-dissipation fingers 151, 152, respectively, as also suggested in FIG. 4.

Figure 6:
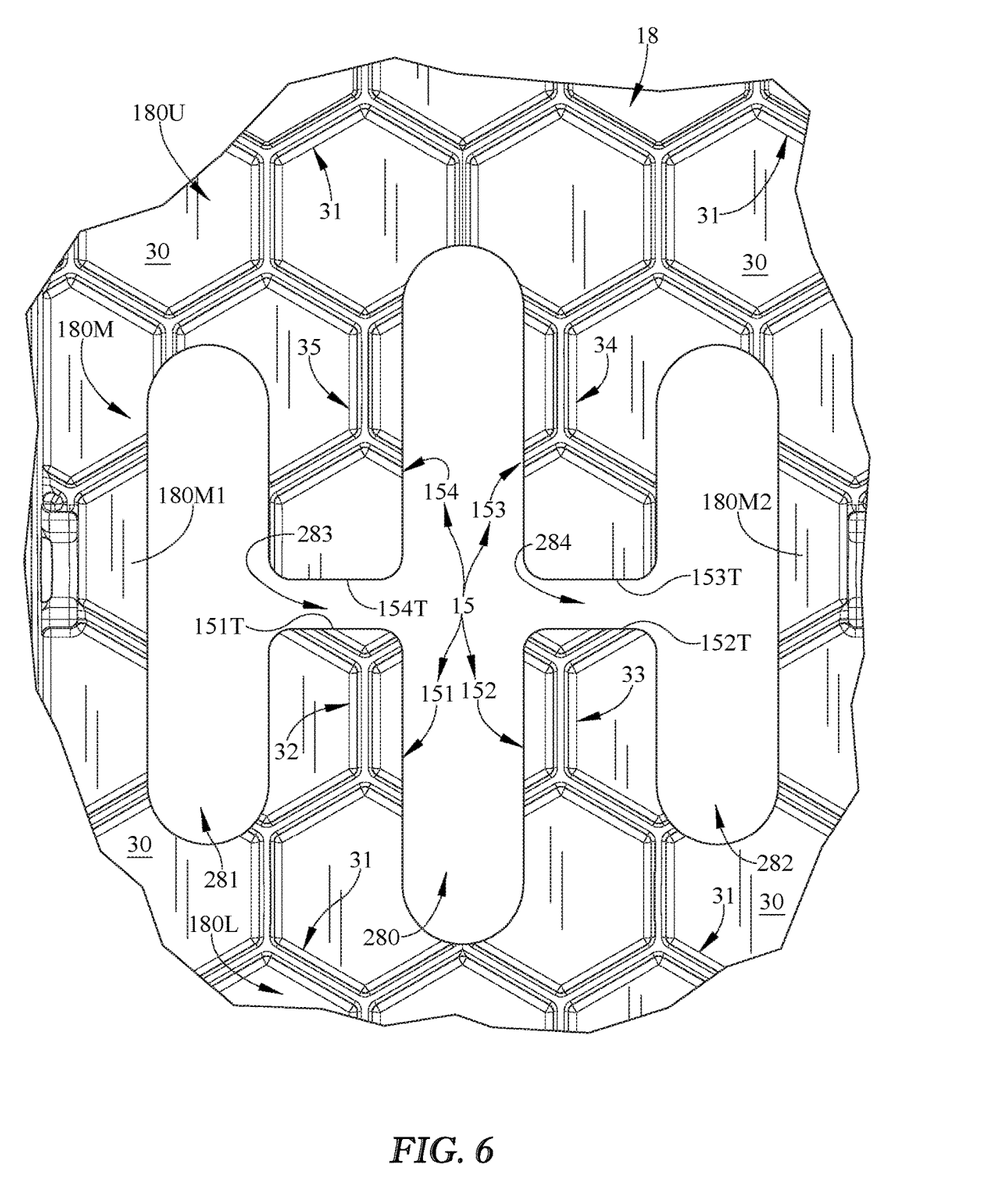

Center panel 180 of headrest 18 also includes a middle portion 180M arranged to interconnect upper and lower portions 180U, 180L as suggested in FIGS. 2 and 6. Upper portion 180U is formed to include a hand grip 180G. Middle portion 180M of center panel 180 is formed to include a first side strip 180M1 and a second side strip 180M2 arranged to lie in laterally spaced-apart relation to first side strip to locate each of the four energy-dissipation fingers 151-154 between first and second side strips 180M1, 2 as suggested in FIGS. 2 and 6. Each of first and second side strips 180M1, 2 is arranged to interconnect portions of upper and lower portions 180U, L of central panel 180 as suggested in FIG. 6.

Slots 280, 281, and 282 are formed in center panel 180 as suggested in FIGS. 2 and 6. Inner side edges of each of the four energy-dissipation fingers 151-154 cooperate to define a long vertical center slot 280 therebetween as suggested in FIGS. 2 and 6. Middle portion 180M is formed to include a short vertical first side slot 281 along an outer side edge of the first and fourth energy-dissipation fingers 151-154 and a short vertical second side slot 282 along an outer side edge of the second and third energy-dissipation fingers 151-154 as suggested in FIGS. 2 and 6. First and fourth energy-dissipation fingers 151, 154 are arranged to lie between the short vertical first side slot 281 and the long vertical center slot 280. Second and third energy-dissipation fingers 152, 153 are arranged to lie between the short second side slot 282 and the long vertical center slot 280. Each of the first and second side slots 281, 282 is characterized by a first length d while the center slot 280 is characterized by a relatively longer length D as suggested in FIG. 2.

Figure 4:
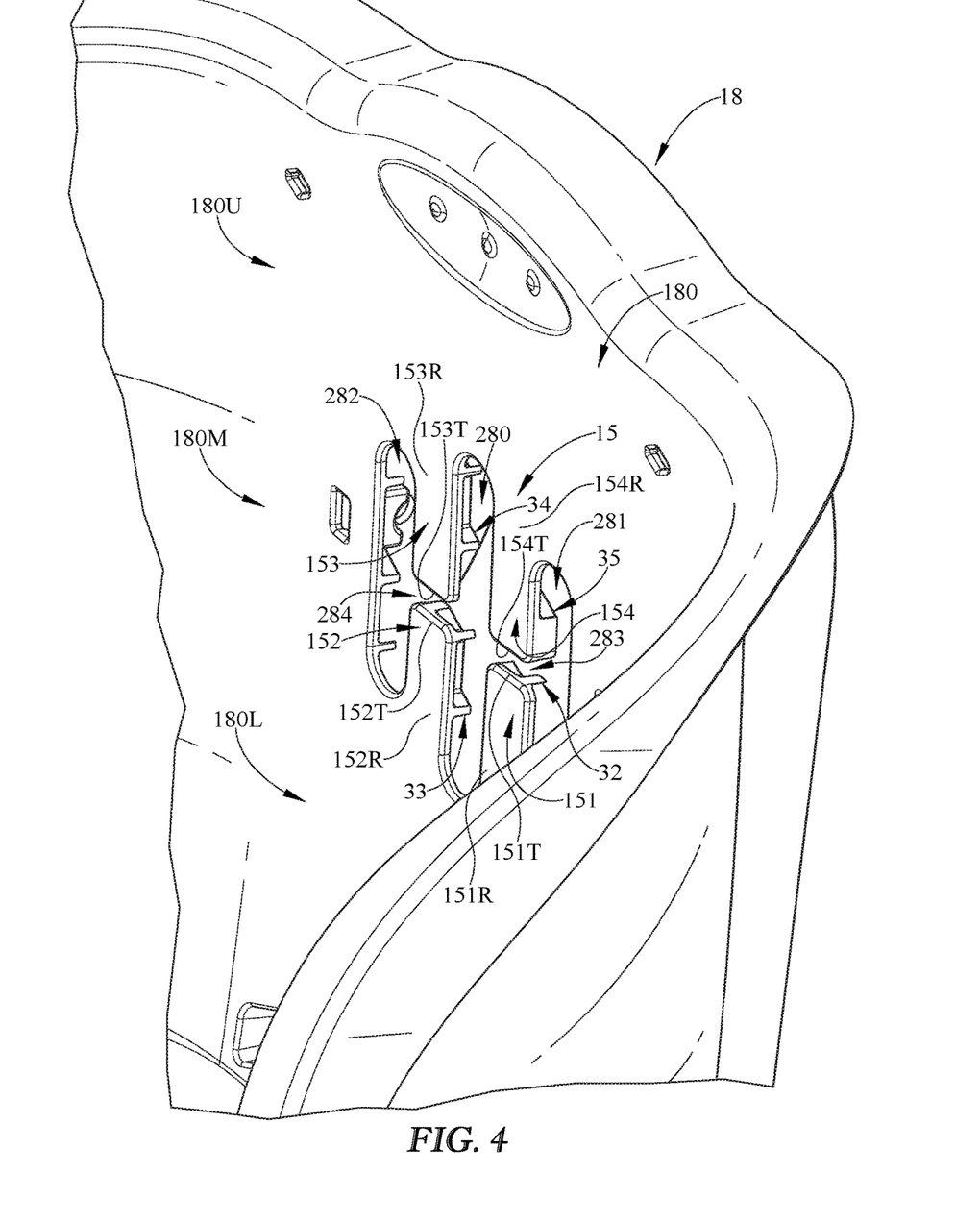
FIG. 4 is an enlarged front perspective view of a portion of the headrest of FIG. 2 taken from a different point of view.

As suggested in FIG. 4, a first horizontal slot 283 is formed between the spaced apart neighboring tips 151T and 154T of energy-dissipation fingers 151, 154. First horizontal slot 283 interconnects center regions of the side-by-side but laterally spaced apart center slot 280 and first side slot 281. Similarly, a second horizontal slot 284 is formed between the spaced-apart neighboring tips 152T and 153T of energy-dissipation fingers 152, 153. Second horizontal slot 284 interconnects center regions of the side-by-side but laterally spaced apart center slot 280 and second side slot 282. In an illustrative embodiment, each of horizontal slots 283, 284 has a relatively narrow width and each of the generally vertical center and side slots 280-282 has a relatively wider width. In illustrative embodiments, the width of horizontal slots 283, 284 are substantially equivalent to one another while the width of vertical slots 280-282 are substantially equivalent to one another. It is within the scope of the present disclosure to provide slots 283, 284 with any suitable shape—non-horizontal or otherwise.

Upper and middle portions 180U, 180M of center panel are arranged to lie between the interconnect side-wing panels 181, 182. Middle portion 180M is coupled to energy-dissipation fingers 151-154 of energy-dissipation system 15. Lower portion 180L is formed to include laterally spaced apart strap-receiving slots 181S, 182S. Each slot 181S, 182S is sized to receive one of the shoulder straps 141, 142 included in a child-restraint harness 14 included in juvenile vehicle seat 12.

Figure 5:
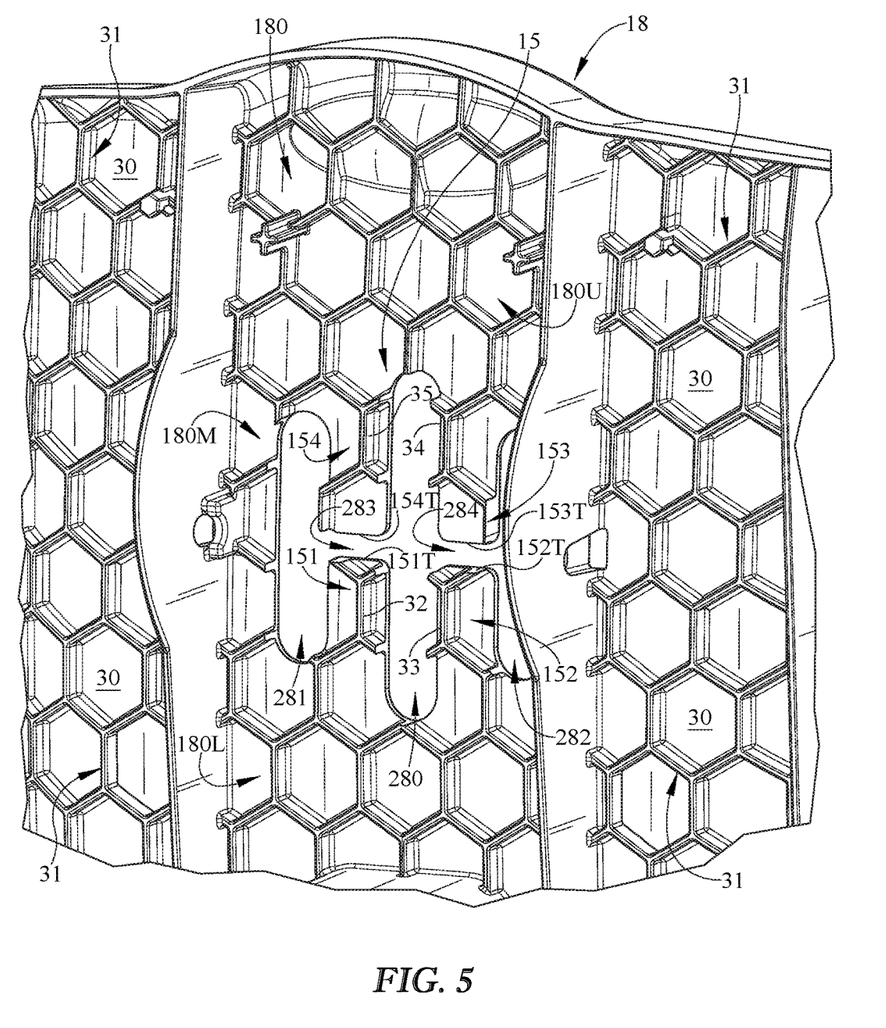
FIG. 5 is an enlarged rear perspective view of a portion of the headrest of FIG. 3 taken from a different point of view showing that the center panel of the headrest includes a sheet and a honeycomb-shaped sheet-rigidifier strip appended to a rearwardly facing surface of the sheet and showing that a partial honeycomb-shaped finger-rigidifier strip is appended to a rearwardly facing surface of each cantilevered energy-dissipation finger.

Center panel 180 of headrest 18 comprises a sheet 30 and a honeycomb-shaped sheet-rigidifier strip 31 coupled to the rearwardly facing surface of sheet 30 to extend away from seat bottom 21 as suggested in FIGS. 2, 5, and 6. Each of cantilevered energy-dissipation fingers 51-54 is coupled (e.g. cantilevered) to sheet 30.

Headrest 18 also includes four partial honeycomb-shaped finger-rigidifier strips 32, 33, 34, and 35 as suggested in FIG. 5. Each of those strips 32-35 is coupled to a rearwardly facing surface of one of the cantilevered energy-dissipation fingers 51-54. In illustrative embodiments, as suggested in FIG. 6, a single continuous honeycomb pattern is used to defined honeycomb-shaped sheet-rigidifier strip 31 and partial honeycomb-shaped finger-rigidifier strips 32-35.

Cantilevered energy-dissipation fingers 51-54 cooperate to define a flexible and displaceable energy dissipater that is coupled to center panel 180 of headrest 18 and allows externally applied energy to dissipate over a relatively longer period of time as compared to a relatively flat continuous piece of material, a foam insert, or an airbag. Such an energy dissipater allows a head-support portion of headrest to be substantially flat without causing additional displacement between the head and shoulders of a child seated on seat bottom 21 of juvenile vehicle seat 12. There is no need for additional components to be added to the seat 12.

Figure 9A:
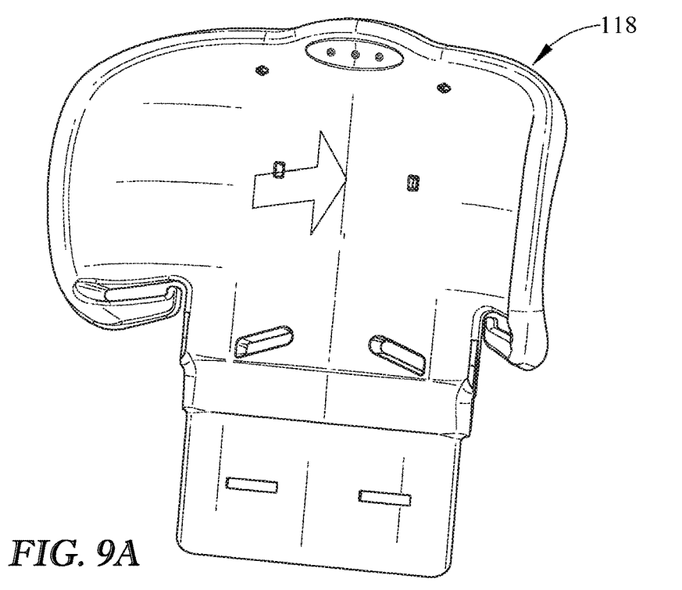
FIG. 9A is a diagrammatic illustration of a compression and force testing process for a first headrests.
Figure 9B:
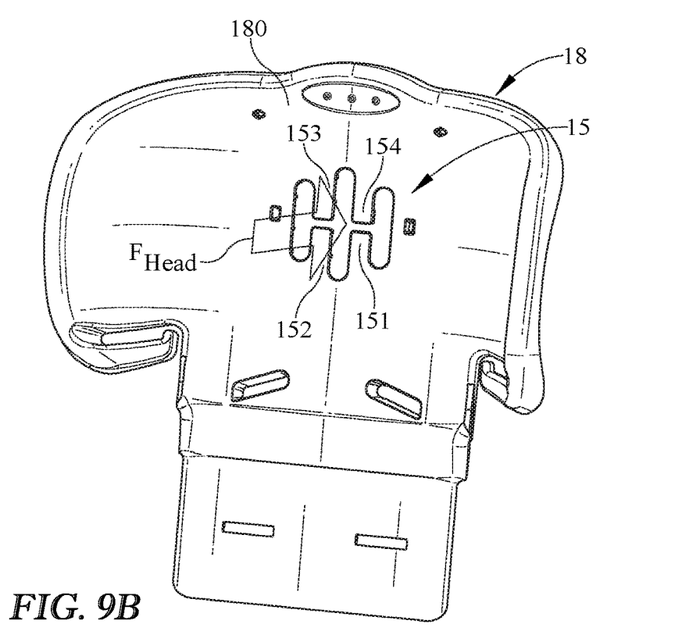
FIG. 9B is a diagrammatic illustration of a compression and force testing process for the headrest of FIGS. 1-8.

A compression testing sequence is described below to illustrate a process for conducting compression and force testing on juvenile vehicle seats 12 and energy-dissipation systems 151-154 of child restraints 10 in accordance with the present disclosure. Illustrative samples, objectives, procedure, and results are illustrated in FIG. 9B and Table 1.

An objective of the compression testing sequence disclosed herein is to conduct compression and force testing on two headrests 18A, 18. A first headrest 118, shown in FIG. 9A, has an unaltered center panel. A second headrest 18, shown in FIG. 9B is configured to include energy-dissipation fingers 151-154. Energy-dissipation fingers 151-154 are coupled to panel 180 of headrest 18 as shown and cooperate to define energy-dissipation system 15 in accordance with the present disclosure.

In such a compression testing sequence, a force comparison is performed between the two illustrated headrests 118, 18. First headrest 118 in FIG. 9A is solid across the contact point of the head of a seated child. A five pound force is applied to the center point of the headrest 118, where contact would be made by a child's head. The maximum deflection of the material where the force is applied is measured and shown below in Table 1. The test is then repeated on first headrest 118 using a ten pound force. Subsequently, second headrest 18, shown in FIG. 9B, is tested. A five pound force is applied to the end of upper finger 154 of second headrest 18 and the maximum deflection of the material as the force is applied is measured and shown below in Table 1. That test is repeated with a ten pound force. A five pound force is then applied to the end of lower finger 151 of headrest 18 and the maximum deflection of the material as the force is applied is measured. That test is repeated with a ten pound force.

The results of the compression testing sequence are shown below in Table 1.

TABLE 1

Compression Testing Results

| Sample ID | Measured Height of Tested Area When Not Compressed | Measurement @ 5 lb-f | Inches Deflection @ 5 lb-f | Measurement @ 10 lb-f | Inches Deflection @ 10 lb-f |
|---|---|---|---|---|---|
| Purple (Solid Surface) | 1.375 | 1.375 | 0 | 1.3125 | 0.0625 |
| Black w Pattern Cut Out (Upper Finger) | 1.25 | 0.875 | 0.375 | 0.5 | 0.75 |
| Black w Pattern Cut Out (Lower Finger) | 1.25 | 0.875 | 0.375 | 0.75 | 0.5 |

A child restraint 10 includes a juvenile vehicle seat 12 and an energy-dissipation system 15 in accordance with the present disclosure as suggested in FIG. 1. Juvenile vehicle seat 12 includes a seat bottom 21 and a seat back 22. Seat back 22 includes a backrest 17 arranged to extend upwardly from seat bottom 21 and a headrest 18 arranged to lie in spaced-apart relation to seat bottom 21 to locate portions of backrest 17 therebetween and adapted to support a head of a child (not shown) seated on seat bottom 21. Energy-dissipation system 15 is configured to provide means coupled to the headrest 18 for dissipating energy associated with movement of the head of a child seated on seat bottom 21 relative to headrest 18 following application of external impact forces to juvenile vehicle seat 12 so that g-loads experienced by the child are minimized.

Energy-dissipation system 15 includes a first energy-dissipation finger 151 having a first root end 151R coupled to headrest 18 and a first tip 151T arranged to lie in spaced-apart relation to headrest 18 and, a second energy-dissipation finger 152 having a second root end 152R coupled to headrest 18 and a second tip 152T arranged to lie in spaced-apart relation to headrest 18. Energy-dissipation system 15 also includes a third energy-dissipation finger 153 having a third root end 153R coupled to headrest 18 and a third tip 153T arranged to lie in spaced-apart relation to headrest 18 and a fourth energy-dissipation finger 154 having a fourth root end 154R coupled to headrest 18 and a fourth tip 154T arranged to lie in spaced-apart relation to headrest 18 as suggested in FIGS. 1 and 4.

Figure 7:
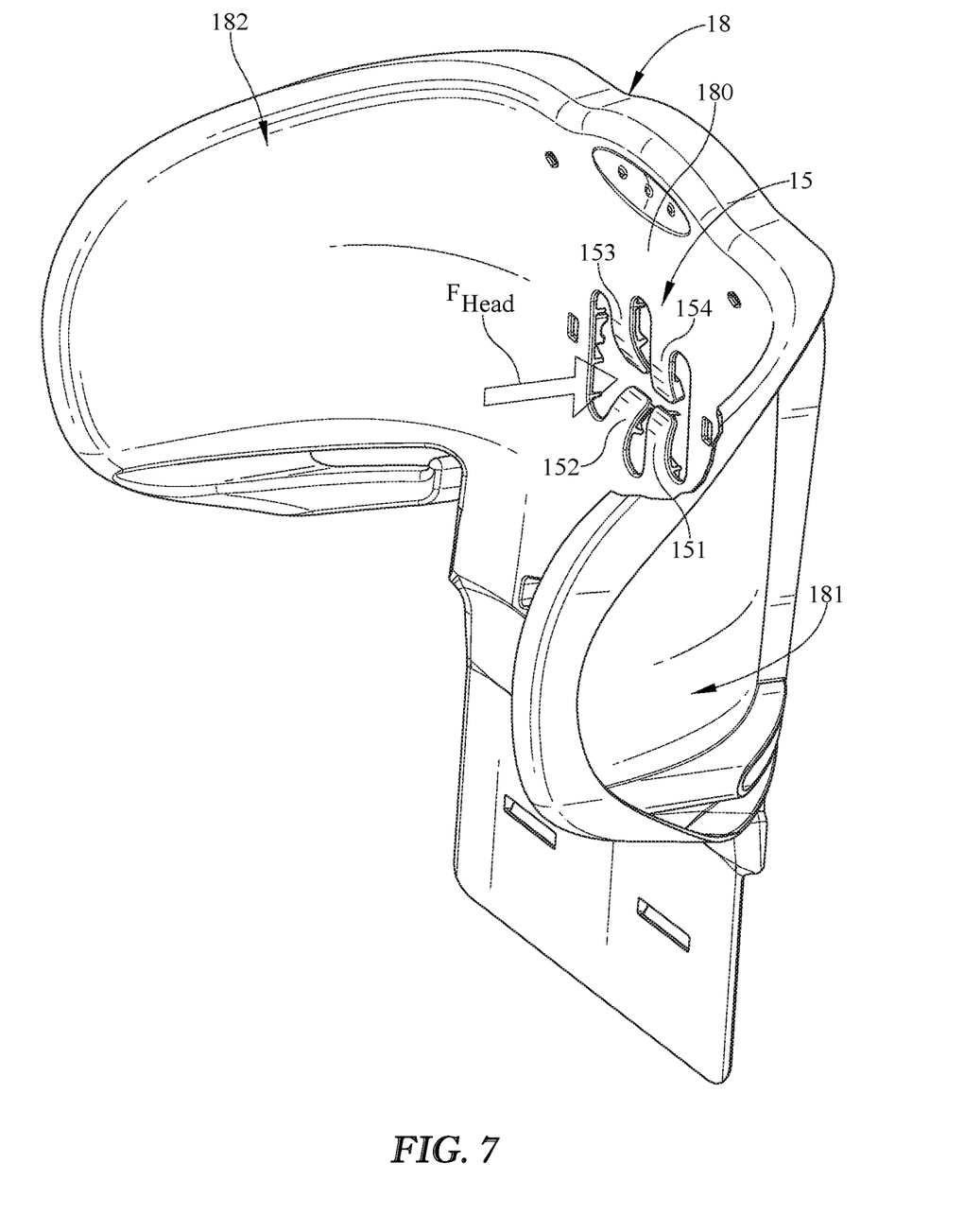
FIG. 7 is a perspective view similar to FIG. 6 using an arrow to represent the head of a child seated in the juvenile vehicle seat of FIG. 1 and suggesting that the head of that child will move in a rearward direction toward the center panel of the headrest during a vehicle crash to impact one or more of the four energy-dissipation fingers included in the energy-dissipation system that is coupled to the headrest.
Figures 8, 8A:
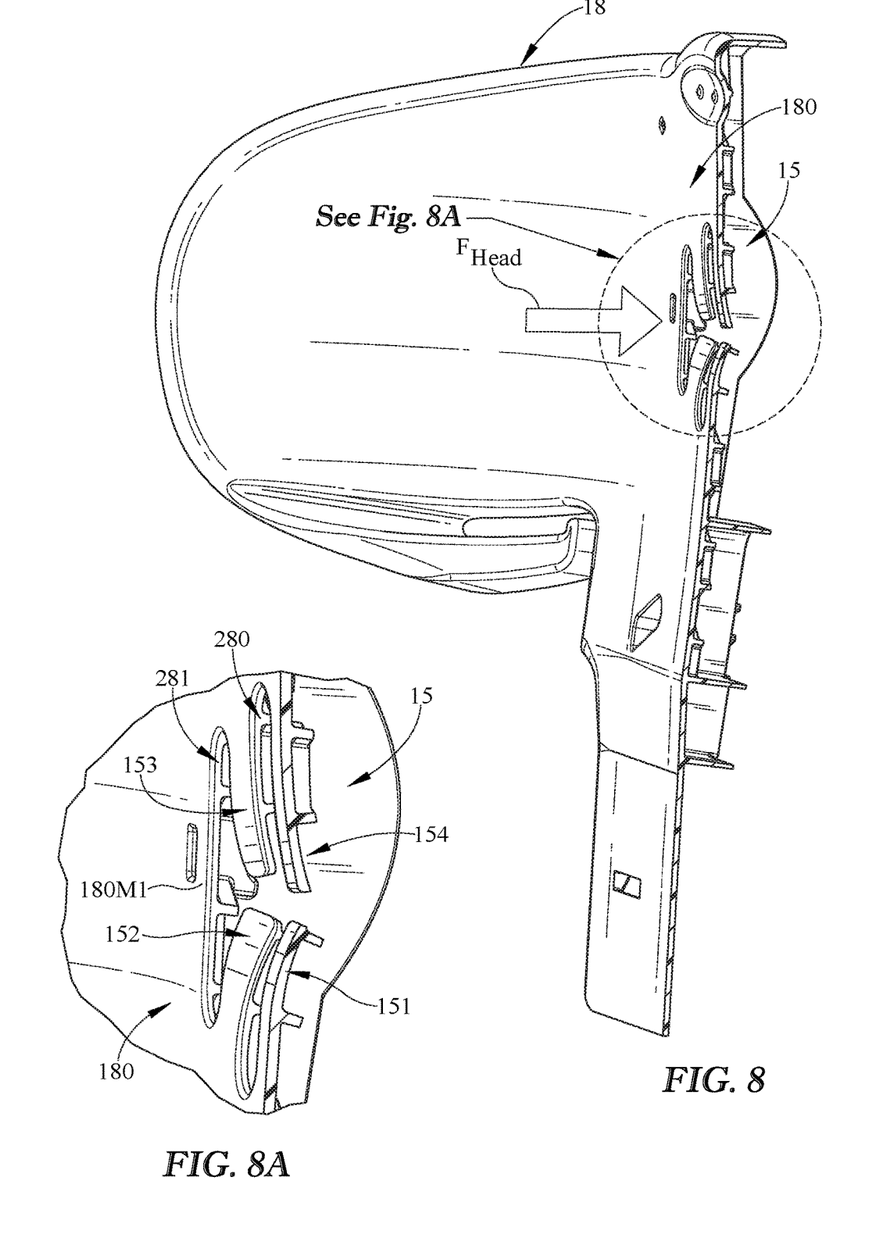
FIG. 8 is an enlarged side elevation view of the headrest of FIG. 7 showing rearward flexing motion of the free ends of the energy-dissipation fingers that are coupled to the headrest to dissipate energy associated with rearward movement of the head of a child seated in the juvenile vehicle seat relative to the headrest.
FIG. 8A is an enlarged view taken from the circled region of FIG. 8.

First and second energy-dissipation fingers 151, 152 are arranged to extend upwardly away from seat bottom 21 to lie in laterally spaced-apart relation to one another as suggested in FIGS. 4-6 and flex rearwardly away from seat bottom 21 in response to application of a rearwardly directed force to the first and second energy-dissipation fingers 151, 152 during movement of the head of the child seated on seat bottom 21 as suggested in FIGS. 7 and 8. Third and fourth energy-dissipation fingers 153, 154 are arranged to extend downwardly toward seat bottom 21 to lie in laterally spaced-apart relation to one another as suggested in FIGS. 4-6 and flex rearwardly away from seat bottom 21 in response to application of a rearwardly directed forces to the third and fourth energy-dissipation fingers 153, 154 during movement of the head of the child seated on seat bottom 21 as suggested in FIGS. 7 and 8.

First and third tips 151T, 153T are arranged to lie in vertically spaced-apart relation to one another to define a first horizontal slot 283 therebetween as suggested in FIGS. 4-6. Second and fourth tips 152T, 154T are arranged to lie in vertically spaced-apart relation to one another to define a second horizontal slot 284 therebetween as suggested in FIGS. 4-6.

First and third energy-dissipation fingers 151, 153 are aligned in tip-to-tip spaced-apart alignment to one another as suggested in FIGS. 1 and 2. Second and fourth energy-dissipation fingers 152, 154 are aligned in tip-to-tip spaced-apart alignment to one another and arranged to cooperate with the first and third energy-dissipation fingers 151, 153 to define a vertical center slot 280 therebetween and in communication with each of the first and second horizontal slots 283, 284 as suggested in FIGS. 1, 2, and 4-6.

Headrest 18 and the first and third energy-dissipation fingers 151, 153 cooperate to define a vertical first side slot 281 located therebetween and arranged to communicate with first horizontal slot 283 and headrest 18 as shown in FIGS. 4-6. Second and fourth energy-dissipation fingers 152, 154 cooperate to define a vertical second side slot 282 located therebetween and arranged to communicate with the second horizontal slot 284 and lie in spaced-apart relation to the vertical first side slot 281 to locate the vertical center slot 280 therebetween as shown in FIGS. 4-6.

Laterally inwardly facing inner side edges of each of the first, second, third and fourth energy-dissipation fingers 151-154 cooperate to define the vertical center slot 280 therebetween as suggested in FIGS. 4-6. Laterally outwardly facing outer side edges of each of the first and third energy-dissipation fingers 151, 153 cooperate with a first portion of headrest 18 to define the vertical first side slot 181 therebetween. Laterally outward facing outer side edges of each of the second and fourth energy-dissipation fingers 152, 154 cooperate with a second portion of headrest 18 to define the vertical second side slot 282 therebetween. The vertical second side slot 282 is formed to lie in spaced-apart location to the vertical first side slot 281 to locate the vertical center slot 280 therebetween.

Each of the vertical first and second side slots 281, 282 has a first length and the vertical center slot 280 has a relatively longer second length as suggested in FIG. 6. Each of the vertical first, second, third, and fourth energy-dissipation fingers 151-154 has a length that is substantially the same as suggested in FIG. 6.

Each of the first and second horizontal slots 281, 282 has a relatively narrow width and each of the center and side slots 280-282 has a relatively wider width as suggested in FIG. 6. Each of the first, second, third, and fourth energy-dissipation fingers 151-154 has a width that is wider than the relatively wider width of the center and side slots 280-282 as suggested in FIG. 6.

Child restraint 10 comprises a juvenile vehicle seat 12 including a seat bottom 21 and a seat back 22 and an energy-dissipation system 15 including first, second, third, and fourth energy-dissipation fingers 151-154 coupled to a panel 180 of seat back 22 and arranged to flex independently of one another when exposed to an external impact force as suggested in FIGS. 1, 7, and 8. First cantilevered energy-dissipation finger 151 is arranged to extend upwardly away from seat bottom 21 as suggested in FIG. 1. Second cantilevered energy-dissipation finger 152 is arranged to lie in laterally spaced-apart, side-by-side relation to the first cantilevered energy-dissipation finger 151. Fourth cantilevered energy-dissipation finger 154 is arranged to extend downwardly toward the first cantilevered energy-dissipation finger 151 to form a first horizontal slot 283 therebetween as suggested in FIGS. 1 and 4. Third cantilevered energy-dissipation finger 153 is arranged to extend downwardly toward the second cantilevered energy-dissipation finger 152 to form a second horizontal slot 284 therebetween and to lie in laterally spaced-apart, side-by-side relation to the fourth cantilevered energy-dissipation finger 154. Panel 180 and the first, second, third, and fourth cantilevered energy-dissipation fingers 151-154 cooperate to define a monolithic component as suggested in FIGS. 2 and 3.

Seat back 22 includes a backrest 17 arranged to extend upwardly from seat bottom 21 and a headrest 18 coupled to backrest 17. Headrest 18 is formed to include the panel 180 that is coupled to each of the cantilevered energy-dissipation fingers 151-154 as suggested in FIGS. 2 and 3. Cantilevered energy-dissipation fingers 151-154 are arranged to lie near a head of a child seated on seat bottom 21 to cause energy associated with rearward movement of the head relative to headrest 18 to be dissipated owing to rearward flexing movement of free ends of the cantilevered energy-dissipation fingers 151-154 relative to the panel 180 that supports those cantilevered energy-dissipation fingers 151-154 so as to absorb external energy associated with the external impact force to minimize g-loads experienced by a child seated in the juvenile vehicle seat 12 having the panel 180 and carrying the energy-dissipation system 15 as suggested in FIGS. 1, 7, and 8. During a rear facing crash, the head will contact energy dissipation system 15. Slots 280-281 allow fingers 151-154 to deform and absorb energy. Fingers 151-154 will flax rearwardly as shown in FIGS. 8 and 8A when impacted by force $F_{Head}$. This additional movement spreads the energy over time to prevent a spike or large concentration of energy from being applied to the head at one time. By spreading energy dissipation over time, the risk of head injury is minimized.

In illustrative embodiments, headrest 18 is mounted for selective up-and-down movement on backrest 17 to change the elevation of headrest 18 and the cantilevered energy-dissipation fingers 151-154 included in panel of headrest 18 at the option of a caregiver. It is within the scope of the present disclosure to fix headrest 18 in a stationary position relative to backrest 17.

Headrest 18 further includes a first side-wing panel 181 coupled to one side of the panel 180 and a second side-wing panel 182 coupled to an opposite second side of the panel 180 to locate and center the panel 180 between the first and second side-wing panels 181, 182 and to cause the panels 180-182 to surround partly the head of a child seated on seat bottom 21. Panel 180 includes an upper portion 180U arranged to lie in spaced-apart relation to seat bottom 21 and coupled to root ends 153R, 154R of each of the third and fourth cantilevered energy-dissipation fingers 153, 154 and a lower portion 180L arranged to lie between the seat bottom 21 and the upper portion 180U and coupled to root ends 151R, 152R of each of the first and second cantilevered energy-dissipation fingers 151, 152.

Panel 180 further includes a middle portion 180M arranged to lie between the upper and lower portions 180U, 180L as suggested in FIGS. 4-6. Middle portion 180M includes a first side strip 180M1 arranged to interconnect the upper and lower portions 180U, 180L and a second side strip 180M2 arranged to interconnect the upper and lower portions 180U, 180L and lie in laterally spaced-apart relation to the first side strip 180M1 to locate the first, second, third, and fourth cantilevered energy-dissipation fingers 151-154 therebetween. First side strip 180M1 and the first and third cantilevered energy-dissipation fingers 151, 153 cooperate to define a vertical first side slot 281 located therebetween and arranged to communicate with the first horizontal slot 283. Second side strip 180M2 and the second and fourth cantilevered energy-dissipation strips 152, 154 cooperate to define a vertical second side slot 282 located therebetween and communicate with the second horizontal slot 284. First, second, third, and fourth cantilevered energy-dissipation fingers 151-154 cooperate to define therebetween a vertical center slot 280 that is arranged to lie between the vertical first and second side slots 281, 282 and communicate with each of the horizontal first and second slots 283, 284.

Panel 180 further includes a first side strip 180M1 and a second side strip 180M2 arranged to lie in laterally spaced-apart relation to the first side strip 180M1 to locate the first, second, third, and fourth cantilevered energy-dissipation fingers 151-154 therebetween. First side strip 180M1 and laterally outwardly facing outer side edges of each of the first and third cantilevered energy-dissipation fingers 151, 153 cooperate to define a vertical first side slot 281 therebetween. Laterally inwardly facing inner side edges of each of the first, second, third, and fourth cantilevered energy-dissipation fingers 151-154 cooperate to define a vertical center slot 280 therebetween. Second side strip 180M2 and laterally outwardly facing outer side edges of each of the second and fourth cantilevered energy-dissipation fingers 152, 154 cooperate to define a vertical second side slot 282 located in laterally spaced-apart relation to the vertical first side slot 281 to locate the vertical center slot 280 therebetween. Panel 180 is formed to cause the horizontal first slot 283 to interconnect and communicate with each of the vertical first side slot 281 and the vertical center slot 280 and to cause the horizontal second slot 284 to interconnect and communicate with each of the vertical center slot 280 and the vertical second side slot 282.

The invention claimed is:

1. A child restraint comprising
a juvenile vehicle seat including a seat bottom and a seat back, the seat back including a backrest arranged to extend upwardly from the seat bottom and a headrest arranged to lie in spaced-apart relation to the seat bottom to locate portions of the backrest therebetween, and adapted to support a head of a child seated on the seat bottom, and
energy-dissipation means coupled to the headrest for dissipating energy associated with movement of the head of a child seated on the seat bottom relative to the headrest following application of external impact forces to the juvenile vehicle seat, wherein the energy-dissipation means includes a first energy-dissipation finger having a first root end coupled to the headrest and a first tip arranged to lie in spaced-apart relation to the headrest, a second energy-dissipation finger having a second root end coupled to the headrest and a second tip arranged to lie in spaced-apart relation to the headrest, a third energy-dissipation finger having a third root end coupled to the headrest and a third tip arranged to lie in spaced-apart relation to the headrest, and a fourth energy-dissipation finger having a fourth root end coupled to the headrest and a fourth tip arranged to lie in spaced-apart relation to the headrest, the first and second energy-dissipation fingers are arranged to extend upwardly away from the seat bottom to lie in laterally spaced-apart relation to one another and flex rearwardly away from the seat bottom in response to application of a rearwardly directed force to the first and second energy-dissipation fingers during movement of the head of the child seated on the seat bottom, and the third and fourth energy-dissipation fingers are arranged to extend downwardly toward the seat bottom to lie in laterally spaced-apart relation to one another and flex rearwardly away from the seat bottom in response to application of a rearwardly directed forces to the third and fourth energy-dissipation fingers during movement of the head of the child seated on the seat bottom.

2. The child restraint of claim 1, wherein the first and third tips are arranged to lie in vertically spaced-apart relation to one another to define a first horizontal slot therebetween.

3. The child restraint of claim 2, wherein the second and fourth tips are arranged to lie in vertically spaced-apart relation to one another to define a second horizontal slot therebetween.

4. The child restraint of claim 3, wherein the first and third energy-dissipation fingers are aligned in tip-to-tip spaced-apart alignment to one another and the second and fourth energy-dissipation fingers are aligned in tip-to-tip spaced-apart alignment to one another and arranged to cooperate with the first and third energy-dissipation fingers to define a vertical center slot therebetween and in communication with each of the first and second horizontal slots.

5. The child restraint of claim 4, wherein the headrest and the first and third energy-dissipation fingers cooperate to define a vertical first side slot located therebetween and arranged to communicate with the first horizontal slot and the headrest and the second and fourth energy-dissipation fingers cooperate to define a vertical second side slot located therebetween and arranged to communicate with the second horizontal slot and lie in spaced-apart relation to the vertical first side slot to locate the vertical center slot therebetween.

6. The child restraint of claim 2, wherein laterally inwardly facing inner side edges of each of the first, second, third and fourth energy-dissipation fingers cooperate to define a vertical center slot therebetween and laterally outwardly facing outer side edges of each of the first and third energy-dissipation fingers cooperate with a first portion of the headrest to define a vertical first side slot therebetween.

7. The child restraint of claim 6, wherein laterally outward facing outer side edges of each of the second and fourth energy-dissipation fingers cooperate with a second portion of the headrest to define a vertical second side slot therebetween and the vertical second side slot is formed to lie in spaced-apart location to the vertical first side slot to locate the vertical center slot therebetween.

8. The child restraint of claim 7, wherein each of the vertical first and second side slots has a first length and the vertical center slot has a relatively longer second length than the first length.

9. The child restraint of claim 8, wherein each of the vertical first, second, third, and fourth energy-dissipation fingers has a length that is generally the same.

10. The child restraint of claim 7, wherein each of the first and second horizontal slots has a width and each of the center and side slots has a relatively wider width than the first and second horizontal slots.

11. The child restraint of claim 10, wherein each of the first, second, third, and fourth energy-dissipation fingers has a width that is wider than the width of the center slot and side slots.

12. A child restraint comprising
a juvenile vehicle seat including a seat bottom and a seat back, the seat back including a panel, and
an energy-dissipation system including first, second, third, and fourth energy-dissipation fingers coupled to the panel and arranged to flex independently of one another when exposed to an external impact force, the first cantilevered energy-dissipation finger is arranged to extend upwardly away from the base, the second cantilevered energy-dissipation finger is arranged to lie laterally spaced-apart by a vertical slot, in side-by-side relation to the first cantilevered energy-dissipation finger, the fourth cantilevered energy-dissipation finger is arranged to extend downwardly toward the first cantilevered energy-dissipation finger to form a first horizontal slot therebetween, and the third cantilevered energy-dissipation finger is arranged to extend downwardly toward the second cantilevered energy-dissipation finger to form a second horizontal slot therebetween and to lie in laterally spaced-apart, side-by-side relation to the fourth cantilevered energy-dissipation finger.

13. The child restraint of claim 12, wherein the panel and the first, second, third, and fourth cantilevered energy-dissipation fingers cooperate to define a monolithic component.

14. The child restraint of claim 12, A child restraint comprising
a juvenile vehicle seat including a seat bottom and a seat back, the seat back including a panel, and
an energy-dissipation system including first, second, third, and fourth energy-dissipation fingers coupled to the panel and arranged to flex independently of one another when exposed to an external impact force, the first cantilevered energy-dissipation finger is arranged to extend upwardly away from the base, the second cantilevered energy-dissipation finger is arranged to lie in laterally spaced-apart, side-by-side relation to the first cantilevered energy-dissipation finger, the fourth cantilevered energy-dissipation finger is arranged to extend downwardly toward the first cantilevered energy-dissipation finger to form a first horizontal slot therebetween, and the third cantilevered energy-dissipation finger is arranged to extend downwardly toward the second cantilevered energy-dissipation finger to form a second horizontal slot therebetween and to lie in laterally spaced-apart, side-by-side relation to the fourth cantilevered energy-dissipation finger,
wherein the seat back includes a backrest arranged to extend upwardly from the seat bottom and a headrest coupled to the backrest and formed to include the panel that is coupled to each of the cantilevered energy-dissipation fingers and the cantilevered energy-dissipation fingers are arranged to lie near a head of a child seated on the seat bottom to cause energy associated with rearward movement of the head relative to the headrest to be dissipated owing to rearward flexing movement of free ends of the cantilevered energy-dissipation fingers relative to the panel that supports those cantilevered energy-dissipation fingers, so as to absorb external energy associated with the external impact force.

15. The child restraint of claim 14, wherein the headrest is mounted for selective up-and-down movement on the backrest to change the elevation of the headrest and the cantilevered energy-dissipation fingers included in the panel of the headrest at the option of a caregiver.

16. The child restraint of claim 14, wherein the headrest further includes a first side-wing panel coupled to one side of the panel, and a second side-wing panel coupled to an opposite second side of the panel to locate and center the panel between the first and second side-wing panels and to cause the panels to surround partly the head of a child seated on the seat bottom, and the panel includes an upper portion arranged to lie in spaced-apart relation to the seat bottom and coupled to root ends of each of the third and fourth cantilevered energy-dissipation fingers and a lower portion arranged to lie between the seat bottom and the upper potion and coupled to root ends of each of the first and second cantilevered energy-dissipation fingers.

17. The child restraint of claim 16, wherein the panel further includes a middle portion arranged to lie between the upper and lower portions, the middle portion includes a first side strip arranged to interconnect the upper and lower portions and a second side strip arranged to interconnect the upper and lower portions and lie in laterally spaced-apart relation to the first and second side strips to locate the first, second, third, and fourth cantilevered energy-dissipation fingers therebetween.

18. The child restraint of claim 17, wherein the first side strip and the first and third cantilevered energy-dissipation fingers cooperate to define a vertical first side slot located therebetween and arranged to communicate with the first horizontal slot, the second side strip and the second and fourth cantilevered energy-dissipation strips cooperate to define a vertical second side slot located therebetween and communicate with the second horizontal slot, and the first, second, third, and fourth cantilevered energy-dissipation fingers cooperate to define therebetween a vertical center slot that is arranged to lie between the vertical first and second side slots and communicate with each of the horizontal first and second slots.

19. A child restraint comprising
  a juvenile vehicle seat including a seat bottom and a seat back, the seat back including a panel, and
  an energy-dissipation system including first, second, third, and fourth energy-dissipation fingers coupled to the panel and arranged to flex independently of one another when exposed to an external impact force, the first cantilevered energy-dissipation finger is arranged to extend upwardly away from the base, the second cantilevered energy-dissipation finger is arranged to lie in laterally spaced-apart, side-by-side relation to the first cantilevered energy-dissipation finger, the fourth cantilevered energy-dissipation finger is arranged to extend downwardly toward the first cantilevered energy-dissipation finger to form a first horizontal slot therebetween, and the third cantilevered energy-dissipation finger is arranged to extend downwardly toward the second cantilevered energy-dissipation finger to form a second horizontal slot therebetween and to lie in laterally spaced-apart, side-by-side relation to the fourth cantilevered energy-dissipation finger,
  wherein the panel and the first, second, third, and fourth cantilevered energy-dissipation fingers cooperate to define a monolithic component child restraint of claim 13,
  wherein the panel further includes a first side strip and a second side strip arranged to lie in laterally spaced-apart relation to the first side strip to locate the first, second, third, and fourth cantilevered energy-dissipation fingers therebetween, the first side strip and laterally outwardly facing outer side edges of each of the first and third cantilevered energy-dissipation fingers cooperate to define a vertical first side slot therebetween, laterally inwardly facing inner side edges of each of the first, second, third, and fourth cantilevered energy-dissipation fingers cooperate to define a vertical center slot therebetween, and the second side strip and laterally outwardly facing outer side edges of each of the second and fourth cantilevered energy-dissipation fingers cooperate to define a vertical second side slot located in laterally spaced-apart relation to the vertical first side slot to locate the vertical center slot therebetween.

20. The child restraint of claim 19, wherein the panel is formed to cause the horizontal first slot to interconnect and communicate with each of the vertical first side slot and the vertical center slot and to cause the horizontal second slot to interconnect and communicate with each of the vertical center slot and the vertical second side slot.

21. A child restraint comprising
  a juvenile vehicle seat including a seat bottom and a seat back, the seat back including a panel, and
  an energy-dissipation system including first, second, third, and fourth energy-dissipation fingers coupled to the panel and arranged to flex independently of one another when exposed to an external impact force, the first cantilevered energy-dissipation finger is arranged to extend upwardly away from the base, the second cantilevered energy-dissipation finger is arranged to lie in laterally spaced-apart, side-by-side relation to the first cantilevered energy-dissipation finger, the fourth cantilevered energy-dissipation finger is arranged to extend downwardly toward the first cantilevered energy-dissipation finger to form a first horizontal slot therebetween, and the third cantilevered energy-dissipation finger is arranged to extend downwardly toward the second cantilevered energy-dissipation finger to form a second horizontal slot therebetween and to lie in laterally spaced-apart, side-by-side relation to the fourth cantilevered energy-dissipation finger,
  wherein the panel comprises a sheet and a honeycomb-shaped sheet-rigidifier strip coupled to a rearwardly facing surface of the sheet to extend away from the seat bottom, each of the first, second, third, and fourth cantilevered energy-dissipation fingers is cantilevered to the sheet, and the panel also includes four partial honeycomb-shaped finger-rigidifier strips each of which is coupled to a rearwardly facing surface of one of the cantilevered energy-dissipation fingers to extend away from the seat bottom.

22. The child restraint of claim 21, wherein the honeycomb-shaped sheet-rigidifier strip and the partial honeycomb-shaped finger-rigidifier strips cooperate to from a single continuous honeycomb pattern.

23. The child restraint of claim 21, wherein the panel and the first, second, third, and fourth cantilevered energy-dissipation fingers cooperate to define a monolithic component.

* * * * *